United States Patent
Shih

(10) Patent No.: US 7,990,464 B2
(45) Date of Patent: Aug. 2, 2011

(54) FOCUSING DEVICE WITH UNINTERRUPTED EXCITATION

(75) Inventor: Chia-Nan Shih, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 653 days.

(21) Appl. No.: 12/166,278

(22) Filed: Jul. 1, 2008

(65) Prior Publication Data

US 2009/0153724 A1    Jun. 18, 2009

(30) Foreign Application Priority Data

Dec. 14, 2007    (CN) .......................... 2007 1 0203054

(51) Int. Cl.
*G03B 13/00*    (2006.01)
*G03B 3/10*    (2006.01)
(52) U.S. Cl. ...................................... 348/357; 396/133
(58) Field of Classification Search .................. 348/345, 348/357

See application file for complete search history.

(56) References Cited

U.S. PATENT DOCUMENTS

| | | | |
|---|---|---|---|
| 2007/0247542 A1 | 10/2007 | Watanabe et al. | |
| 2007/0273783 A1* | 11/2007 | Okazaki et al. | 348/345 |
| 2008/0007644 A1* | 1/2008 | Matsumoto | 348/345 |

* cited by examiner

*Primary Examiner* — Clayton E Laballe
*Assistant Examiner* — Dennis Hancock
(74) *Attorney, Agent, or Firm* — Zhigang Ma

(57) ABSTRACT

A focusing device includes a vertical-synchronization-signal generator generating a vertical-synchronization-signal sequence including vertical synchronization signals, an excitation-sequence generator generating an excitation sequence according to the vertical-synchronization-signal sequence and applying excitation according to the excitation sequence, and a driving module driving a lens of an imaging system according to the excitation sequence. Vertical-synchronization-signal times are formed between two adjacent vertical synchronization signals. A first vertical-synchronization-signal time and a last vertical-synchronization-signal time are formed at a beginning and an end of the vertical-synchronization-signal sequence respectively. Each vertical-synchronization-signal time includes a sub time and an exposure time arranged sequentially. A preceding excitation is only applied in the sub time of the first vertical-synchronization-signal time, a succeeding excitation is only applied in sub time of the last vertical-synchronization-signal time and a phase-fixed excitation is applied in each exposure time of each vertical-synchronization-signal time except the exposure time of the last vertical-synchronization-signal time.

4 Claims, 2 Drawing Sheets

FOCUSING DEVICE WITH UNINTERRUPTED EXCITATION

BACKGROUND

1. Field of the Invention

The present invention relates to a focusing device used in an imaging system.

2. Description of the Related Art

Focusing devices are widely used in imaging systems for improved imaging. Generally, a focusing device includes a stepper motor used for focusing a lens of the imaging system. Without a preceding excitation, a still stepper motor may be rotated incorrectly following an attempt to abruptly travel at high speeds, resulting in a possible failure to properly guide and focus the lens. Similarly, a succeeding excitation is needed to gradually halt the stepper motor. Moreover, the preceding and succeeding excitations to the stepper motor help to ensure the reliability of its rotation.

An auto-focusing approach of the imaging system is that the lens of the imaging system is driven by the stepper motor to different focusing positions according to a vertical-synchronization-signal sequence in order to obtain an auto-focusing curve. A peak of the auto-focusing curve shows the best focusing position of the lens, thereby bringing an image into focus.

The vertical-synchronization-signal sequence includes a plurality of vertical synchronization signals. A time interval between two adjacent vertical synchronization signals forms a vertical-synchronization-signal time. Each vertical-synchronization-signal time may include a sub time and an exposure time (shutter speed) arranged sequentially. The sub time may further include three sequential stages: the preceding excitation is applied to the stepper motor in a first stage, a phase-changed excitation is applied to the stepper motor in a second stage, and the succeeding excitation is applied to the stepper motor in a third stage. However, the stepper motor does not rotate during the first and the third stages, which results in a long duration of focusing.

What is needed, therefore, is to provide a focusing device, in which the above problem is eliminated or at least alleviated.

SUMMARY

The present invention relates to a focusing device used in an imaging system utilizing a lens. The focusing device includes a vertical-synchronization-signal generator for generating a vertical-synchronization-signal sequence, an excitation-sequence generator coupled to the vertical-synchronization-signal generator for generating an excitation sequence according to the vertical-synchronization-signal sequence and applying excitation according to the excitation sequence, and a driving module coupled to the excitation-sequence generator for driving a lens of an imaging system to different focusing positions according to the excitation sequence. The vertical-synchronization-signal sequence includes a plurality of vertical synchronization signals. A plurality of vertical-synchronization-signal times are formed between two adjacent vertical synchronization signals. A first vertical-synchronization-signal time and a last vertical-synchronization-signal time are formed at a beginning and an end of the vertical-synchronization-signal sequence, respectively. Each of the plurality of vertical-synchronization-signal times includes a sub time and an exposure time arranged sequentially. In the excitation sequence, a preceding excitation is only applied in the sub time of the first vertical-synchronization-signal time, a succeeding excitation is only applied in the sub time of the last vertical-synchronization-signal time, and a phase-fixed excitation being applied in each exposure time of each of the vertical-synchronization-signal times except the exposure time of the last vertical-synchronization-signal time.

Other advantages and novel features of the present invention will become more apparent from the following detailed description of an exemplary embodiment when taken in conjunction with the accompanying drawings.

DETAILED DESCRIPTION OF THE EMBODIMENT

References will now be made to the figures to describe an exemplary embodiment in detail.

Figure 1:
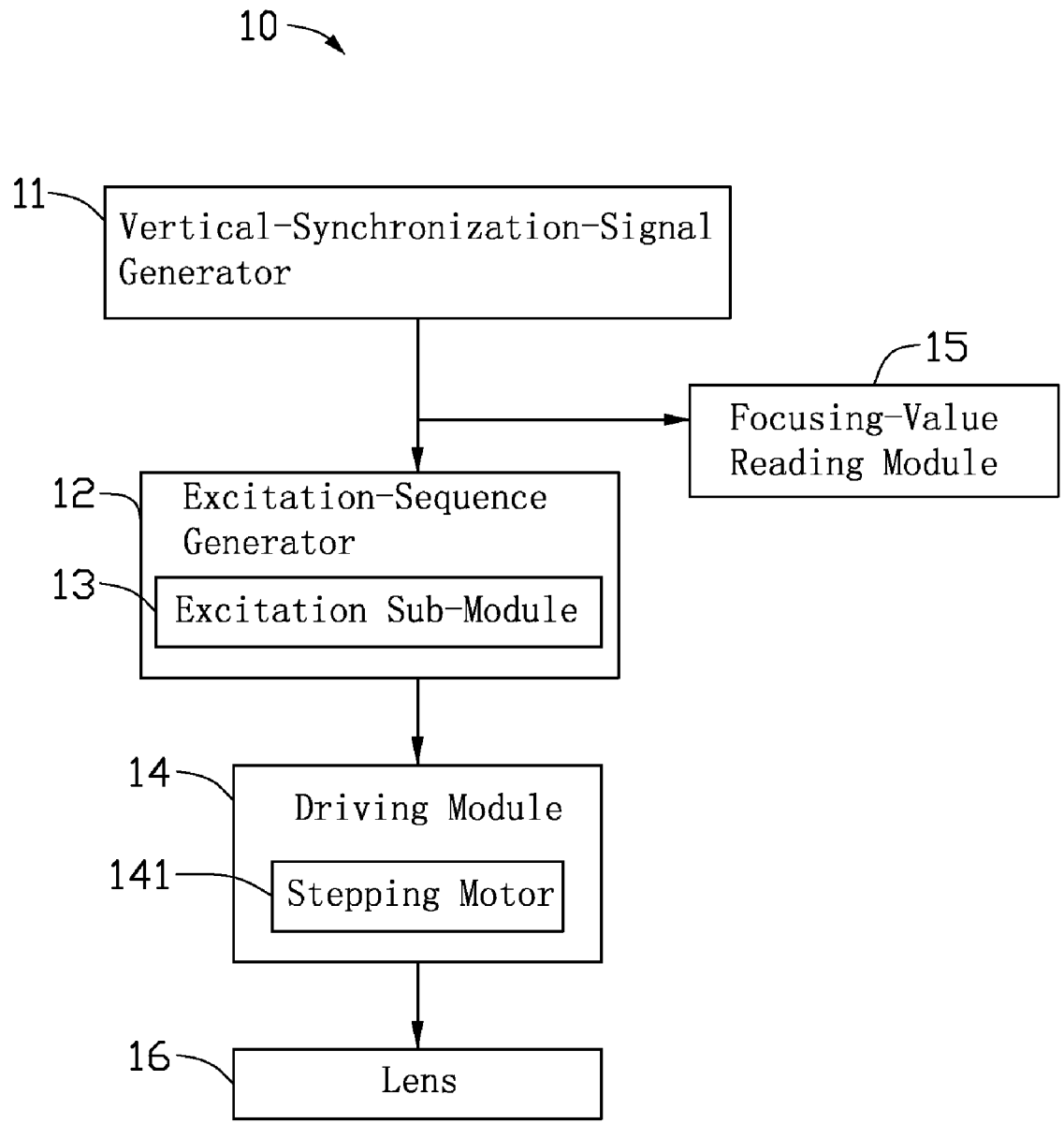
FIG. 1 is a structural block diagram of a focusing device according to an exemplary embodiment.

Referring to FIG. 1, a focusing device 10, according to an exemplary embodiment, is shown. The focusing device includes a vertical-synchronization-signal (VS) generator 11, an excitation-sequence (ES) generator 12, a driving module 14, and a focusing-value reading module 15.

Figure 2:
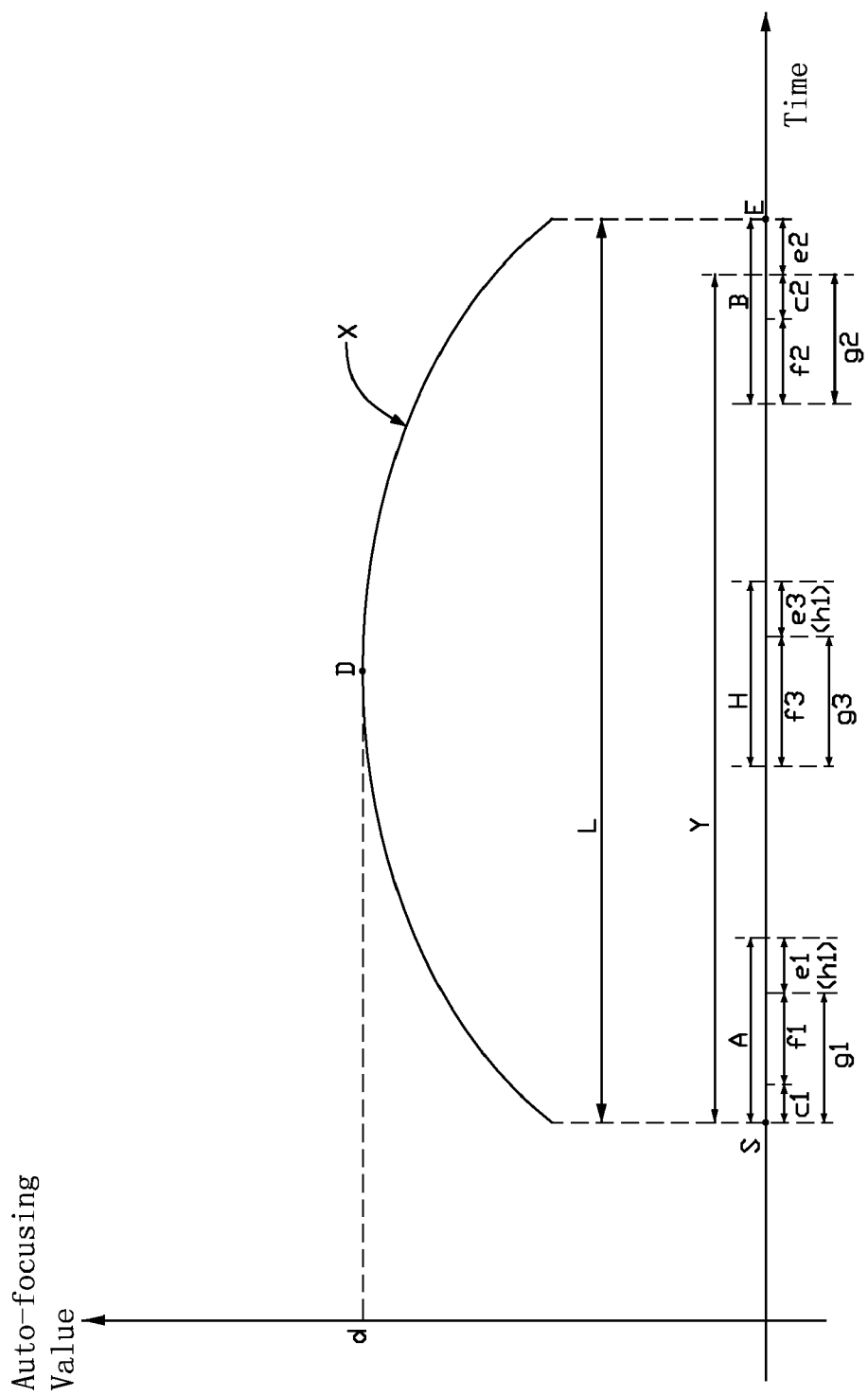
FIG. 2 is a diagram of an excitation sequence of a stepper motor of the imaging device of FIG. 1.

Referring to FIGS. 1 and 2, the VS generator 11 generates a vertical-synchronization-signal sequence L. A vertical axis of a diagram represents an auto-focusing value, and a horizontal axis of the diagram represents time in FIG. 2. A beginning of the sequence L is represented as point S, and an end of the sequence L is represented as point E. A time interval between two adjacent vertical synchronization signals forms a vertical-synchronization-signal time. Each vertical-synchronization-signal time includes a sub time and an exposure time arranged sequentially. The sub times of the vertical-synchronization-signal times are equal to each other, and the exposure times of the vertical-synchronization-signal times are equal to each other. An imaging sensor (not shown) may be exposed during the exposure time.

A first vertical-synchronization-signal time is represented as A, and a last vertical-synchronization-signal time is represented as B. The first vertical-synchronization-signal time A includes a sub time g1 and an exposure time e1, and the last vertical-synchronization-signal time B includes a sub time g2 and an exposure time e2, as shown in FIG. 2.

The ES generator 12 is capable of generating an excitation sequence Y according to the vertical-synchronization-signal sequence L. Furthermore, a preceding excitation c1 may be only applied in the first vertical-synchronization-signal time A, and a succeeding excitation c2 may be only applied in the last vertical-synchronization-signal time B. Therefore, the preceding excitation c1 and a phase-changed excitation f1 may be applied in the sub time g1, and a phase-changed excitation f2 and the succeeding excitation c2 may be applied in the sub time g2. A phase-changed excitation may be applied in each sub time of the vertical-synchronization-signal times between the first vertical-synchronization-signal time A and the last vertical-synchronization-signal time B. During the phase-changed excitation, pulses are applied to the driving module 14. A phase-fixed excitation h1 is applied in each exposure time of each of the vertical-synchronization-signal time except the exposure time e2 of the last vertical-synchronization-signal time B. During the phase-fixed excitation, pulses are not applied to the driving module 14.

Referring to FIG. 2, a vertical-synchronization-signal time H between the first vertical-synchronization-signal time A and the last vertical-synchronization-signal time B may include a sub time g3 and an exposure time e3 arranged sequentially. A phase-changed excitation f3 may be only applied in the sub time g3. The phase-fixed excitation h1 is applied in the exposure time e1 of the first vertical-synchronization-signal time A and the exposure time e3 of the vertical-synchronization-signal time H.

The ES generator 12 further includes an excitation sub-module 13. In the excitation sequence Y, the excitation sub-module 13 is capable of uninterruptedly applying excitation to the driving module 14 in the vertical-synchronization-signal times (including the first vertical-synchronization-signal time A) before the last vertical-synchronization-signal time B and the sub time f2 of the last vertical-synchronization-signal time B.

The driving module 14 is capable of driving a lens 16 of the imaging system to different focusing positions. The driving module 14 may include a stepper motor 141. Rotation of the stepper motor 141 is dependent on pulses applied thereto. Therefore, the stepper motor 141 rotates during all phase-changed excitations to drive the lens 16 of the imaging system to different focusing positions. Conversely, the stepper motor 141 does not rotate during the preceding excitation c1, all the phase-fixed excitations h1, and the succeeding excitation c2. Therefore, rotation of the stepper motor 141 is dependent on the excitation sequence Y to drive the lens 16 of the imaging system 10.

The focusing-value reading module 15 is capable of reading a plurality of focusing values according to the vertical-synchronization-signal sequence L, and establishing an auto-focusing curve X using the plurality of focusing values. Referring to FIG. 2, a peak D of the auto-focusing curve X shows the best focusing position of the lens of the imaging system 10.

The following is an example to compare a focusing time of a typical focusing device with a focusing time of the focusing device 10 of the exemplary embodiment.

Common conditions for the example: 120 pulses are needed from the beginning S to the end E of the vertical-synchronization-signal sequence L; pulses per second are 1000 pulses; duration of the preceding excitation is 2 pulses (also 2 milliseconds), and duration of the succeeding excitation is 10 milliseconds (ms); a vertical-synchronization-signal time is 1/30 seconds; a sub time is 20 ms.

In the typical focusing device, a time T in which the stepper motor 141 rotates in each vertical-synchronization-signal time is found using the formula: T=T0−T1−T2, where T0 is a sub time, T1 is the duration of the preceding excitation in the sub time, and T2 is the duration of the succeeding excitation in the sub time. Therefore, the time T in which the stepper motor 141 rotates in one vertical-synchronization-signal time is 8 ms. Pulses during each phase-changed excitation applied to the stepper motor 141 in one vertical-synchronization-signal time are 8 pulses. From the beginning S to the end E of the vertical-synchronization-signal sequence L, numbers of the vertical-synchronization-signal time are 120/8=15. Therefore, a focusing time of the typical focusing device is 15×(1/30)=0.5 (seconds).

In the focusing device 10 of the exemplary embodiment, a time T1' in which the stepper motor 141 rotates in the first vertical-synchronization-signal time is 20−2=18 (ms), and pulses during the phase-changed excitation f1 applied to the stepper motor 141 in the first vertical-synchronization-signal time are 18 pulses. A time T2' in which the stepper motor 141 rotates in the last vertical-synchronization-signal time is 20−10=10 (ms), and pulses during the phase-changed excitation f2 applied to the stepper motor 141 in the last vertical-synchronization-signal time are 10 pulses. A time T' in which the stepper motor 141 rotates in each of the vertical-synchronization-signal times between the first and the last vertical-synchronization-signal times is 20 ms, and pulses during the phase-changed excitation f3 applied to the stepper motor 141 in each of the vertical-synchronization-signal times between the first and the last vertical-synchronization-signal times are 20 pulses. From the beginning to the end of the vertical-synchronization-signal sequence L, numbers of the vertical-synchronization-signal time are 1+1+[(120−18−10)/20]≈7. Therefore, a focusing time of the focusing device of the exemplary embodiment is 7×(1/30)≈0.233 (seconds).

Since the preceding excitation and the succeeding excitation are only applied respectively in the first and the last vertical-synchronization-signal times, a focusing time of the focusing device 10 of the exemplary embodiment is reduced.

It is to be understood, however, that even though numerous characteristics and advantages of the present invention have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A focusing device used in an imaging system utilizing a lens, comprising:
    a vertical-synchronization-signal generator capable of generating a vertical-synchronization-signal sequence, the vertical-synchronization-signal sequence including a plurality of vertical synchronization signals, a plurality of vertical-synchronization-signal times being formed between two adjacent vertical synchronization signals, a first vertical-synchronization-signal time and a last vertical-synchronization-signal time being formed at a beginning and an end of the vertical-synchronization-signal sequence respectively, each of the plurality of vertical-synchronization-signal times including a sub time and an exposure time arranged sequentially;
    an excitation-sequence generator coupled to the vertical-synchronization-signal generator, and capable of generating an excitation sequence according to the vertical-synchronization-signal sequence and applying excitation according to the excitation sequence, in the excitation sequence, a preceding excitation being only applied in the sub time of the first vertical-synchronization-signal time, a succeeding excitation being only applied in sub time of the last vertical-synchronization-signal time, a phase-fixed excitation being applied in each exposure time of each of the vertical-synchronization-signal times except the exposure time of the last vertical-synchronization-signal time; and
    a driving module coupled to the excitation-sequence generator capable of driving the lens of the imaging system to different focusing positions according to the excitation sequence.

2. The focusing device as claimed in claim 1, wherein a phase-changed excitation is further applied in the sub time of each of the vertical-synchronization-signal times.

3. The focusing device as claimed in claim 2, wherein the driving module includes a stepper motor for driving the lens of the imaging system according to the excitation sequence, the stepper motor rotating during the phase-changed excitation in the sub time of each of the vertical-synchronization-signal times, the stepper motor not rotating during the phase-fixed excitation in the exposure time in the vertical-synchronization-signal time, the preceding excitation, and the succeeding excitation.

4. The focusing device as claimed in claim 1, wherein the excitation-sequence generator further includes an excitation sub-module capable of applying the excitation to the driving module.

* * * * *